(12) United States Patent
Simons (10) Patent No.: US 9,877,464 B2
(45) Date of Patent: Jan. 30, 2018

(54) RESTRAINT SYSTEM FOR AN ANIMAL

(71) Applicant: The Pet Salon, Inc., Margate, NJ (US)

(72) Inventor: Charles Ross Simons, Margate, NJ (US)

(73) Assignee: THE PET SALON, INC.

( * ) Notice: Subject to any disclaimer, the term of this patent is extended or adjusted under 35 U.S.C. 154(b) by 43 days.

(21) Appl. No.: 15/224,857

(22) Filed: Aug. 1, 2016

(65) Prior Publication Data

US 2016/0338321 A1 Nov. 24, 2016

Related U.S. Application Data

(63) Continuation-in-part of application No. 14/625,936, filed on Feb. 19, 2015, now abandoned.

(51) Int. Cl.
*A01K 13/00* (2006.01)
*A01K 15/04* (2006.01)

(52) U.S. Cl.
CPC ............ *A01K 15/04* (2013.01); *A01K 13/001* (2013.01)

(58) Field of Classification Search
CPC ....... A01K 13/00; A01K 13/001; A01K 15/04
See application file for complete search history.

(56) References Cited

U.S. PATENT DOCUMENTS

| 4,316,433 | A | 2/1982 | Hebert |
| 4,549,502 | A | 10/1985 | Namdari |
| 4,836,144 | A * | 6/1989 | Cole ................... A01K 13/001 119/651 |
| 4,930,453 | A | 6/1990 | Laliberte |
| 5,009,196 | A | 4/1991 | Young |
| 5,243,931 | A | 9/1993 | McDonough |
| 5,373,814 | A | 12/1994 | Seymour |
| 5,678,511 | A | 10/1997 | Day |
| 5,829,392 | A | 11/1998 | Coleman |
| 5,974,601 | A | 11/1999 | Drane et al. |
| 6,079,368 | A | 6/2000 | Paddock |
| 6,553,943 | B1 | 4/2003 | Murphy |

(Continued)

FOREIGN PATENT DOCUMENTS

| DE | 3150442 A1 * | 6/1983 | .......... A01K 13/001 |
| WO | WO-2006017711 A2 * | 2/2006 | .......... A01K 13/001 |

OTHER PUBLICATIONS

Master Equipment Polypro Grooming Tubs, PetEdge, Inc., PetEdge.com, 2 pages, Accessed on Jan. 7, 2015.

(Continued)

*Primary Examiner* — Monica L Williams
(74) *Attorney, Agent, or Firm* — The Belles Group, P.C.

(57) ABSTRACT

A restraint system for an animal includes a frame having top and bottom frame parts and a plurality of frame risers extending therebetween to maintain the top and bottom frame parts in a spaced apart manner; a perforated support surface affixed the frame; riser support members coupled to the frame, at least one of which is slidably coupled to the frame; a first riser arm affixed to a first riser support member; a first coupler coupled to the first riser arm; a second riser arm affixed to a second riser support member; a second coupler coupled to the second riser arm; and a first restraining loop configured to be placed around a neck of a first animal and to cross tie between the first coupler and the second coupler.

19 Claims, 10 Drawing Sheets

(56) References Cited

U.S. PATENT DOCUMENTS

| | | |
|---|---|---|
| 6,925,964 B2 | 8/2005 | Jeffery |
| 6,935,276 B2 | 8/2005 | Powers |
| 7,219,625 B2 | 5/2007 | Powers |
| 7,836,854 B1 | 11/2010 | Hawkins |
| 7,921,812 B1 | 4/2011 | Carrillo |
| 8,061,304 B1 | 11/2011 | Ramsay et al. |
| 8,186,308 B1 | 5/2012 | Hluben et al. |
| 8,371,248 B2 | 2/2013 | Redick |
| 8,566,973 B2 | 10/2013 | Duczak |
| 8,904,965 B1 | 12/2014 | Redick |
| 2010/0043722 A1* | 2/2010 | Elkins .................. A01K 1/04 119/814 |
| 2011/0083613 A1 | 4/2011 | Redick |

OTHER PUBLICATIONS

Pet Grooming bathtub, dog bathtubs, pet products, www.lulusoso.com, 4 pages, Accessed on Jan. 7, 2015.
Groomer's Best Raised Floor Tub Grate, PetEdge, Inc., PetEdge.com, 2 pages, Accessed on Jan. 7, 2015.
Groomer's Best Tub Floor Grates, PetEdge, Inc., PetEdge.com, 2 pages, Accessed on Jan. 7, 2015.
ME REPL GRMG Arm for TP2012 & TP5856, PetEdge, Inc., PetEdge.com, 2 pages, Accessed on Jan. 7, 2015.

* cited by examiner

RESTRAINT SYSTEM FOR AN ANIMAL

CROSS-REFERENCE TO RELATED APPLICATIONS

Priority is claimed as a continuation-in-part application to U.S. patent application Ser. No. 14/625,936, filed Feb. 19, 2015, the disclosure of which is incorporated herein by reference in its entirety.

FIELD OF THE INVENTION

The field of the present invention relates to a restraint system for an animal, particularly a restraint system which may be employed within a wash basin and used while an animal is washed.

BACKGROUND OF THE INVENTION

Pet groomers and pet owners alike generally recognize the benefits of periodic baths for their animals, particularly for dogs, although other animals may also benefit from periodic washing. Regardless of whether a pet is washed by a professional groomer or at home, the pet is typically placed in a wash basin, a sink, a bath tub, or a similar structure (collectively referred to herein as a "wash basin") for washing. Washing a pet can lead to discomfort and anxiety for the pet, and a pet which is experiencing discomfort or anxiety places the groomer or pet owner at a higher risk of being bitten. At the same time, a pet experiencing discomfort or anxiety during a wash also places the pet at an increased risk of injury, and the risk of injury is only increased if the pet is restrained improperly within the wash basin.

In order to reduce the incidents of pets biting while they are being washed, specially designed wash basins have been developed in which a pet may be restrained within the wash basin. A problem with such wash basins is that they are designed as wash basins with a restraint system "bolted" on as an afterthought—and so the restraint system may be less than ideal. Moreover, because such wash basins require the user, whether a pet groomer or a pet owner, to invest in a whole new wash basin in order to gain the benefit of having the restraint system, many choose not to incur the costs of such an investment.

As a result, many pet groomers and pet owners have turned to after market restraint systems, to be used in conjunction with already-owned wash basins, in order to gain the recognized benefits of a pet restraint while washing the pet. Such after market restraint systems come in all types. One example of such a restraint system is described in U.S. Pat. No. 4,316,433. This restraint system includes a washing stand which fits into the bottom of a sink, so that the pet can stand on the washing stand, and a tether rises up from the washing stand to go around the pet's neck. Another example of a restraint system is described in U.S. Pat. No. 5,373,814. This restraint system discloses multiple tethers that attach to a pet's collar, each tether affixes to a suction cup, and the suction cups secure the tethers to the sides of the wash basin. Other versions of restraint systems that employ one or more tethers affixed to suction cups are also known. Yet another example of a restraint system is described in U.S. Pat. No. 7,219,625. This restraint system discloses a container having a lid with holes in it, with the pet being placed on the lid for washing, and a restraining bar is attached to the container, the restraining bar extending above the pet's head so that a restraining loop may secure the pet from overhead. Each of these after market restraint systems has shortcomings insofar as facilitating the washing environment for the pet and restraining the pet so as to minimize the discomfort and anxiety of the animal and increase safety of the groomer or pet owner.

SUMMARY OF THE INVENTION

The present invention is directed toward a restraint system for an animal. The restraint system may be advantageously used in a wash basin for when an animal is being washed. Advantageously, the restraint system may enable a groomer or pet owner to cross tie various sizes of animals while keeping the paws of a restrained animal out of pooling water in a wash basin.

In a first separate aspect of the present invention, a restraint system for an animal includes: a bottom frame; a perforated support surface affixed atop the bottom frame; a first riser arm affixed to a first side of the bottom frame; a second riser arm affixed to a second side of the bottom frame, the first side being opposite the second side; a cross arm coupled between the first riser arm and the second riser arm, the first and second riser arms supporting the cross arm above the perforated support surface; a first upper coupler affixed to the cross arm; a first side coupler affixed to one of the first riser arm and the second riser arm; and a first restraining loop configured to be placed around a neck of a first animal and to cross tie between the first upper coupler and the first side coupler.

In a second separate aspect of the present invention, a restraint system for an animal includes: a bottom frame; a perforated support surface affixed atop the bottom frame, the perforated support surface comprising a first surface section and a second surface section, wherein the first surface section is disposed in a first plane and the second surface section is disposed in a second plane, wherein the first and second planes are parallel and not coplanar; a first riser arm affixed to a first side of the bottom frame; a second riser arm affixed to a second side of the bottom frame, the first side being opposite the second side; a cross arm coupled between the first riser arm and the second riser arm, the first and second riser arms supporting the cross arm above the perforated support surface; a first upper coupler affixed to the cross arm; a first side coupler affixed to one of the first riser arm and the second riser arm; and a first restraining loop configured to be placed around a neck of a first animal and to cross tie between the first upper coupler and the first side coupler.

In a third separate aspect of the present invention, a restraint system for an animal includes: a bottom frame; a perforated support surface affixed atop the bottom frame; a first riser arm affixed to a first side of the bottom frame; a second riser arm affixed to a second side of the bottom frame, the first side being opposite the second side; a cross arm coupled between the first riser arm and the second riser arm, the first and second riser arms supporting the cross arm above the perforated support surface; a first upper coupler affixed to the cross arm; a second upper coupler affixed to the cross arm; a first side coupler affixed to one of the first riser arm and the second riser arm, wherein the first side coupler is slidably coupled to the one of the first riser arm and the second riser arm, and the first side coupler is configured to be secured in a fixed position on the respective first or second riser arm; a second side coupler affixed to the other of the first riser arm and the second riser arm, wherein the second side coupler is slidably coupled to the other of the first riser arm and the second riser arm, and the second side coupler is configured to be secured in a fixed position on the respective first or second riser arm; and a first restraining loop configured to be placed around a neck of a first animal and to cross tie between the first upper coupler and the first side coupler.

In a fourth separate aspect of the present invention, a restraint system for an animal includes: a frame having a top frame part, a bottom frame part, and a plurality of frame risers extending between the top and bottom frame parts and maintaining the top and bottom frame parts in a spaced apart manner; a perforated support surface affixed to at least one of the top frame part and the bottom frame part; a plurality of riser support members coupled to the top frame part and to the bottom frame part, wherein at least one of the riser support members is slidably coupled to the top and bottom frame parts, the plurality of riser support members comprising a first riser support member and a second riser support member; a first riser arm affixed to the first riser support member; a first coupler coupled to the first riser arm; a second riser arm affixed to the second riser support member; a second coupler coupled to the second riser arm; and a first restraining loop configured to be placed around a neck of a first animal and to cross tie between the first coupler and the second coupler.

In a fifth separate aspect of the present invention, a restraint system for an animal includes: a frame having a top frame part, a bottom frame part, and a plurality of frame risers extending between the top and bottom frame parts and maintaining the top and bottom frame parts in a spaced apart manner; a perforated support surface affixed to the frame, the perforated support surface comprising a first surface section and a second surface section, wherein the first surface section is disposed in a first plane and the second surface section is disposed in a second plane, the first and second planes being parallel and non-coplanar; a plurality of riser support members coupled to the top frame part, the plurality of riser support members comprising a first riser support member and a second riser support member; a first riser arm affixed to the first riser support member; a first coupler coupled to the first riser arm; a second riser arm affixed to the second riser support member; a second coupler coupled to the second riser arm; and a first restraining loop configured to be placed around a neck of a first animal and to cross tie between the first coupler and the second coupler.

In a sixth separate aspect of the present invention, a restraint system for an animal includes: a frame having a top frame part which includes a first frame segment and a second frame segment, the second frame segment pivotably coupled to the first frame segment, a bottom frame part, and a plurality of frame risers extending between the top and bottom frame parts and maintaining the top and bottom frame parts in a spaced apart manner; a perforated support surface affixed to the frame, the perforated support surface comprising a first surface section and a second surface section, wherein the first surface section is disposed in a first plane and the second surface section is disposed in a second plane, the first and second planes being parallel and non-coplanar; a plurality of riser support members coupled to the top frame part and to the bottom frame part, wherein at least one of the riser support members is slidably coupled to the top and bottom frame parts, the plurality of riser support members comprising first, second, third, and fourth riser support members; a first riser arm affixed to the first riser support member; a first coupler coupled to the first riser arm; a second riser arm affixed to the second riser support member; a second coupler coupled to the second riser arm; a third riser arm affixed to the third riser support member; a third coupler coupled to the third riser arm; a fourth riser arm affixed to the fourth riser support member; and a fourth coupler coupled to the fourth riser arm.

Accordingly, an improved animal restraint is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
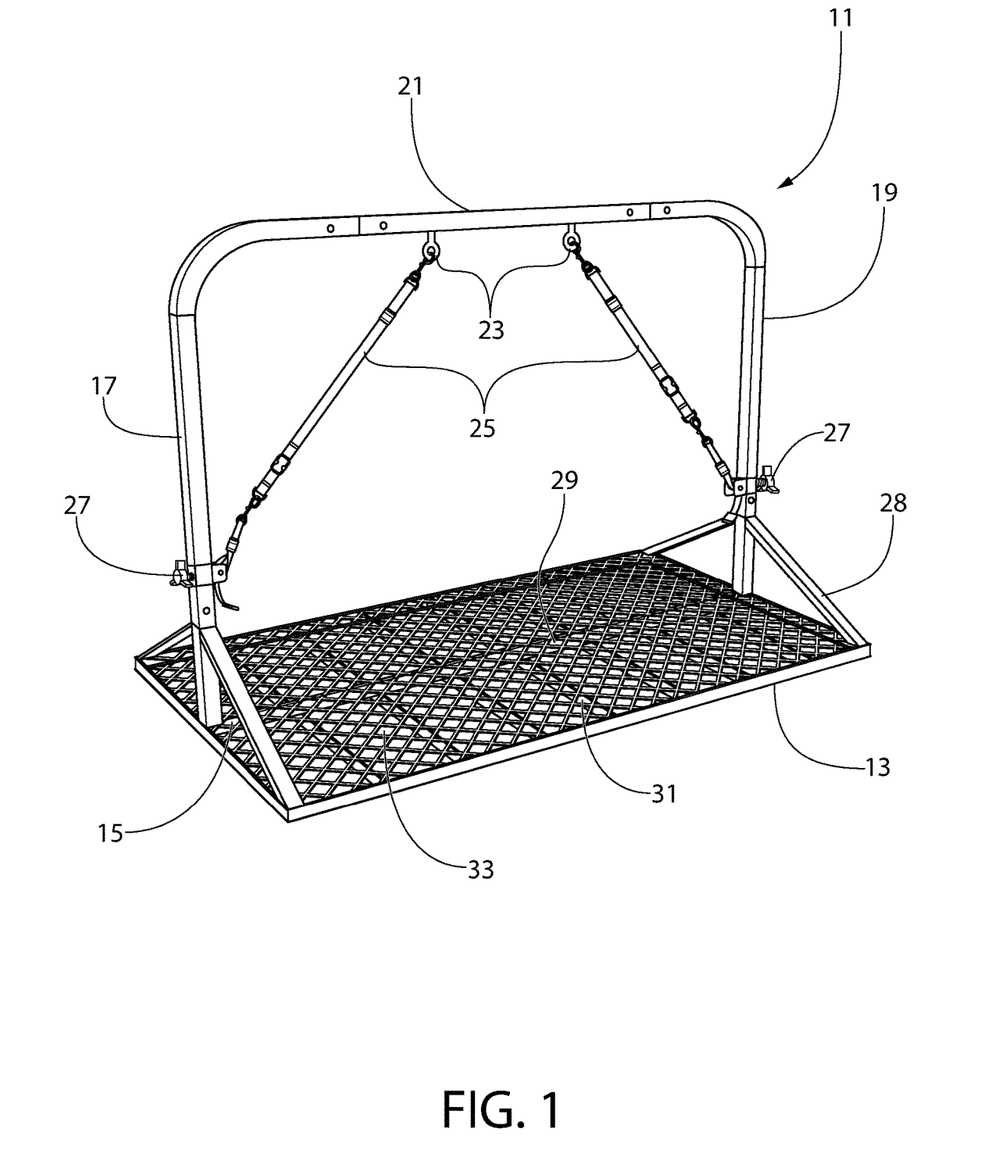
FIG. 1 is a perspective view of a first restraint system for an animal.

Turning in detail to the drawings, FIG. 1 illustrates restraint system 11 for an animal. This restraint system 11 is one that is particularly well suited for use within a wash basin to wash an animal, although it may also be used free standing or on other support surfaces. A perforated support surface 13 is affixed atop a bottom frame 15. A first riser arm 17 is affixed to and extends upward from a first side of the bottom frame 15, and a second riser arm 19 is affixed to and extends upward from a second side of the bottom frame 15, with the first and second sides being opposite each other. In order to maximize free space for an animal when the restraint system 11 is placed within a wash basin, the first and second riser arms 17, 19 are positioned in approximately the center the respective first and second sides of the bottom frame 15. Of course, alternative placements for the first and second riser arms 17, 19 may also be used. In addition, the first and second riser arms 17, 19 need not be symmetrically placed. A cross arm 21 is coupled between the first riser arm 17 and the second riser arm 19. The cross arm 21 includes two upper couplers 23 which serve as upper connection points for the restraining loops 25. Each of the first and second riser arms 17, 19 include side couplers 27 which serve as side connection points so that the restraining loops 25 may be cross tied between the upper couplers 23 and the respective side couplers 27.

Figure 2:
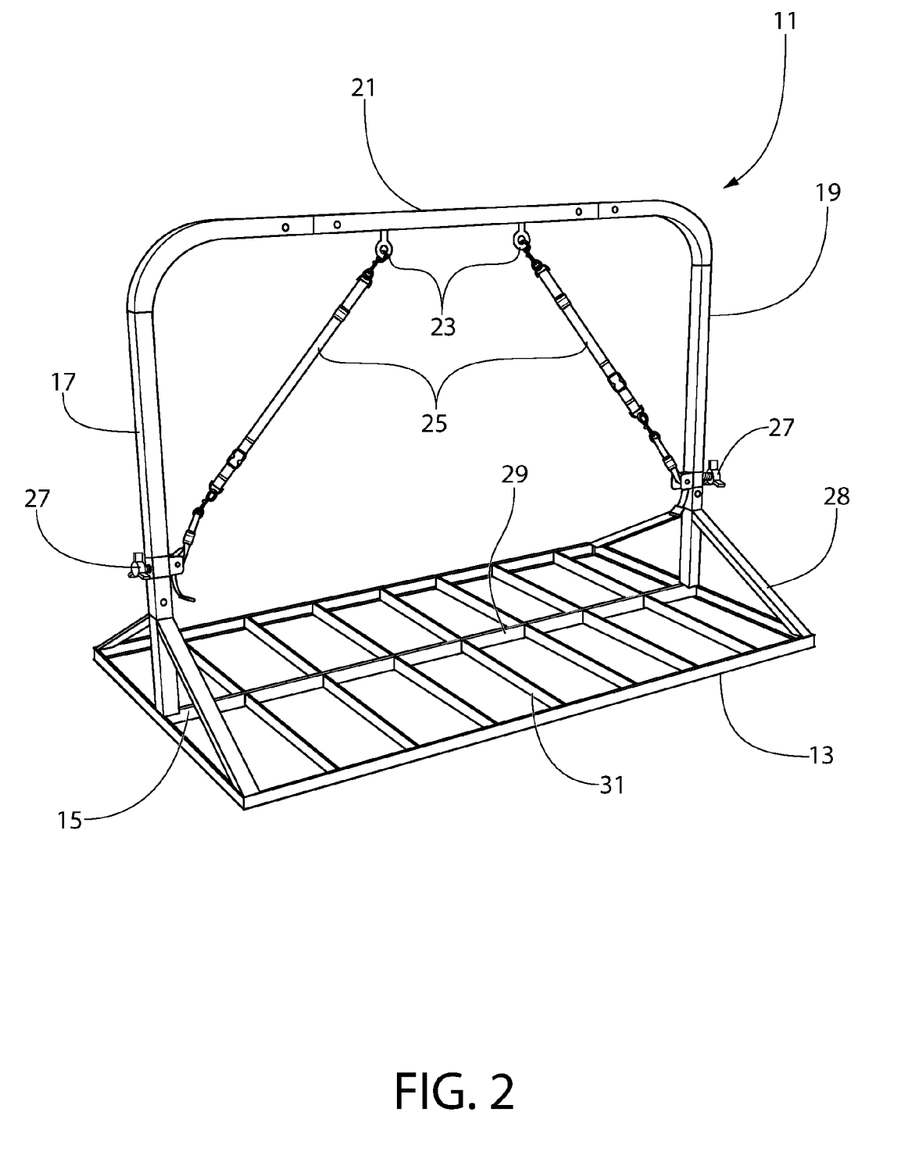
FIG. 2 is a perspective view of the first restraint system with the perforated support surface removed to show the bottom frame 15.

The bottom frame 15 is constructed to provide a support base for the first and second riser arms 17, 19 and a platform for the perforated support surface 13. As such, the bottom frame is rigidly constructed. To provide additional support to the first and second riser arms 17, 19, buttresses 28 may be included between each of the first and second riser arms 17, 19 and the bottom frame 15. In certain embodiments, additional struts may be added to the first and second riser arms 17, 19 to provide additional stability, particularly when the restraint system 11 is used within a wash basin. For example, struts may be added to the first and second riser arms 17, 19 that extend toward extending per As shown in FIG. 2, the bottom frame 15 is formed of a longitudinal beam 29 secured at one end to the first riser arm 17 and at the other end to the second riser arm 19. A plurality of transverse ribs 31 are secured to the longitudinal beam 29 so that the bottom frame forms a base to which the perforated support surface 13 is secured. In embodiments of the restraint system 11 intended to be used in a wash basin, the longitudinal beam 29 and the transverse ribs 31 should be made out of a material that will not be corroded or rusted by water or the chemicals used for washing an animal. By way of example, both the longitudinal beam 29 and the transverse ribs 31 may be constructed from stainless steel square tubing that is welded in the desired configuration to support the perforated support surface 13.

In certain embodiments, additional struts may be added to the first and second riser arms 17, 19 to provide additional stability, particularly when the restraint system 11 is used within a wash basin. For example, struts may be added to the first and second riser arms 17, 19 that extend perpendicular to the longitudinal beam. Such a strut may be long enough to contact a rear wall of a wash basin to provide additional stability, if such is needed or desired.

The bottom portion of the bottom frame 15 includes a plurality of flow regions 33 for the flowing of a liquid under the top of the support surface 13. In the restraint system 11 of FIGS. 1 and 2, the bottom surface of the perforated support surface 13 is separated from the top surface of the bottom frame 15 by spacers (not shown) to create a gap between the bottom surface of the perforated support surface 13 and the top surface of the bottom frame 15. This gap enables liquid to flow between the various adjacent flow regions 33. Enabling liquid to flow between the flow regions is especially important when the restraint system 11 is placed within a wash basin, so that the liquid can flow to the drain without the animal standing in the liquid, which can potentially contain chemicals, such as shampoos or flea and/or tick treatments, that may negatively impact the animal by prolonged contact with the paws. In alternative configurations, the bottom frame 15 itself may be configured with curved portions, feet, risers, and the like to create the one or more flow channels. In configurations in which feet or risers are included, such feet or risers may be made of a material that will provide scratch and/or surface protection for when the restraint system is used in a wash basin.

The perforated support surface 13 is also constructed out of a material that will not be corroded or rusted by water or the chemicals used for washing an animal. Optionally, the perforated support surface 13 may be constructed from an alternative core material, one which at least provide sufficient strength to support an animal, with the core material having an exterior coating that is resistant to corrosion or rust and protects the core material from corrosion or rust. The perforated support surface 13 provides a sufficiently stable surface on which an animal may stand, yet has perforations that are sufficiently numerous and sized to allow a liquid and small dirt, debris, and fur to pass as an animal is washed.

Both the first and second riser arms 17, 19 extend upward from the bottom frame 15 to support the cross arm 21. The combination of the first and second riser arms 17, 19 and the cross arm 21 may be constructed from any number of segments, and all may be constructed from a tubular material, such as a stainless steel tube. As shown, the cross arm 21 is in a fixed position relative to the first and second riser arms 17, 19, however in alternative embodiments, the cross arm 21 may be movably affixed to the first and second riser arms 17, 19 so that the height of the cross arm 21 above the perforated support surface 13 is adjustable. Each of the first and second riser arms 17, 19 has a side coupler 27 affixed thereto. The side couplers 27 are shown as arm clamps, as such arm clamps are height adjustable on the respective first and second riser arms 17, 19. One embodiment of such arm clamps is described in greater detail below. Other types of side couplers 27 may be used, such as eyebolts, hooks, swivel clasps, and the like. Both of the side couplers 27 need not be the same type of coupler. By using an arm clamp as a side coupler 27 on one or both of the first and second riser arms 17, 19, the side coupler 27 is then slidably coupled to and may be secured in a fixed position on the respective one of the first and second riser arms 17, 19.

The upper couplers 23 are shown as eyebolts extending downward from the cross arm 21. Other types of upper couplers 23 may be used, such as arm clamps, hooks, swivel clasps, and the like. Both of the upper couplers 23 need not be the same type of coupler. By using one or more arm clamps as upper couplers 23 on the cross arm 21, the upper coupler 23 is then slidably coupled to and may be secured in a fixed position on the cross arm 21, thereby providing for greater versatility of use with animals of differing sizes.

Figure 3:
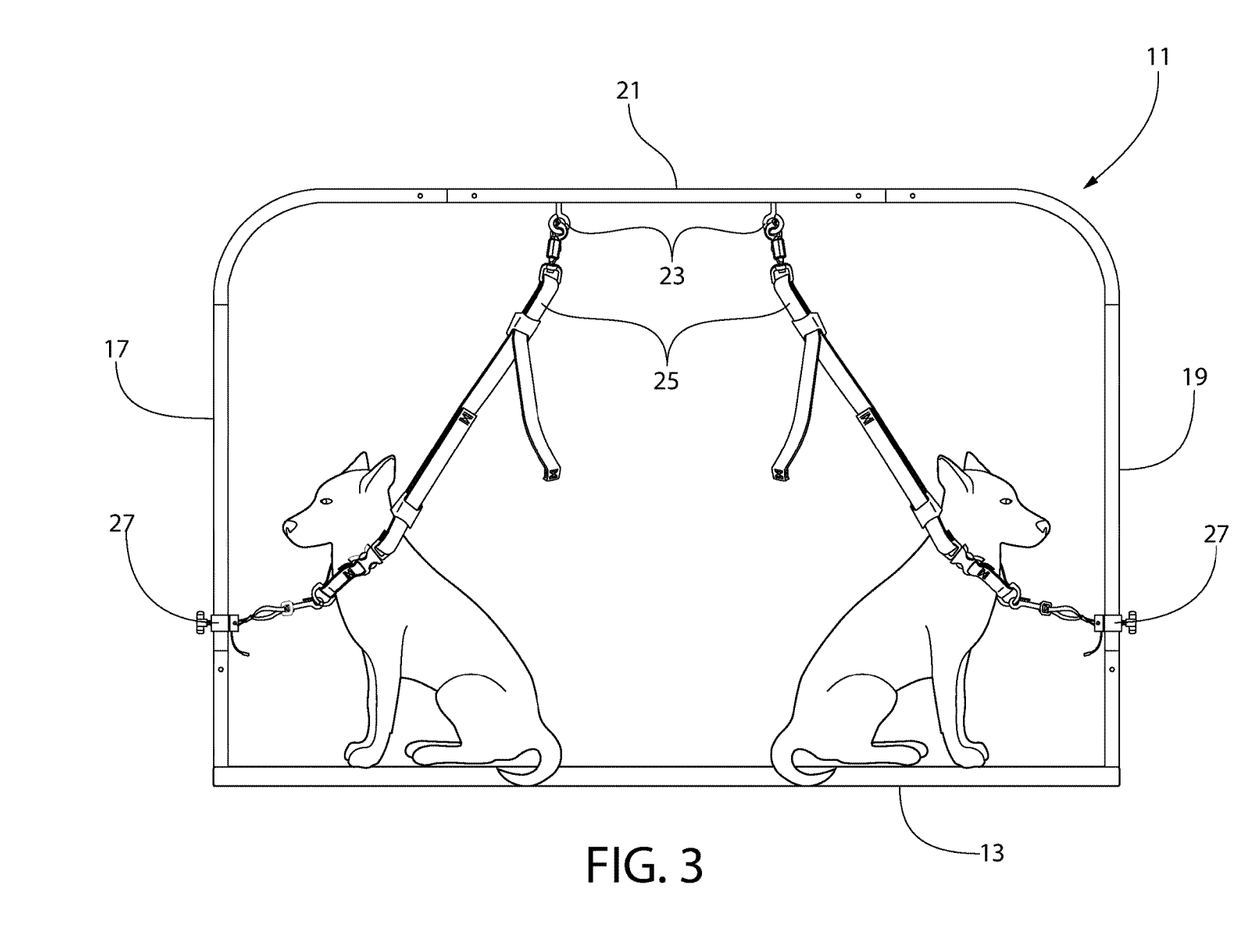
FIG. 3 is a front elevation view of the restraint system of FIG. 1.

In some configurations, the side coupler 27 and upper coupler 23 on one side of the restraint system 11 may be omitted. As shown in FIG. 3, when both the first and second riser arms 17, 19 include side couplers 27 and the cross arm 21 includes two upper couplers 23, the restraint system 11 may be used to safely secure two dogs simultaneously, thereby enabling both to be groomed and/or washed at the same time. Alternatively, the restraint system 11 may advantageously be used within a wash basin so that a groomer or pet owner may easily groom and/or wash one side of the animal while the animal is cross tied toward the first riser arm 17, and then groom and/or wash the other side of the animal while the animal is cross tied toward the second riser arm 19.

One embodiment of the restraining loop 25 that may be advantageously used with the restraint system 11 is shown and described in U.S. Pat. No. 8,365,685 and in U.S. Pat. No. 8,925,496, the disclosures of which are incorporated herein by reference in their entirety. Those of skill in the art will recognize that the restraining loop 25 is placed around the neck of an animal, without placing pressure on the throat, so that the animal may be cross tied using the restraint system 11 as described herein. Those of skill in the art will also recognize that the restraining loop 25 may take many different forms and still be useable as part of the restraint system 11.

Figure 4A:
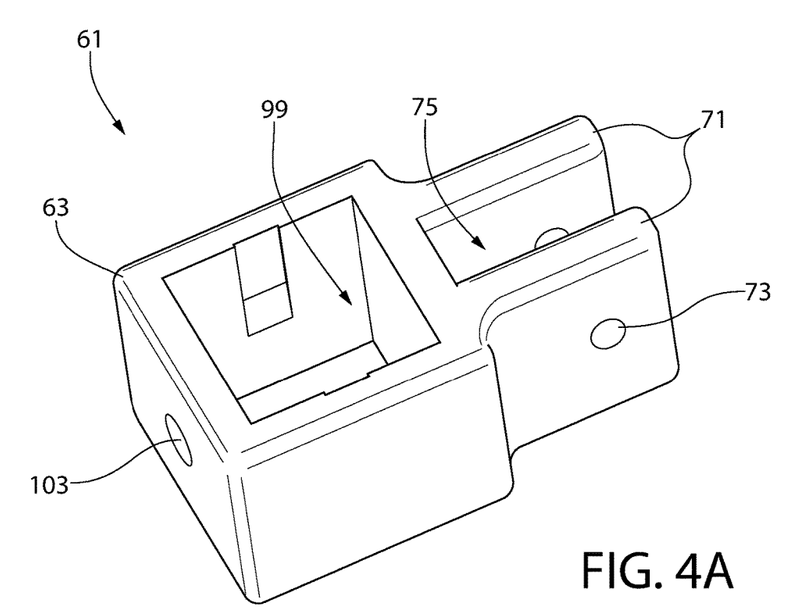
FIG. 4A is a perspective view of a first embodiment of an arm clamp body.
Figure 4B:
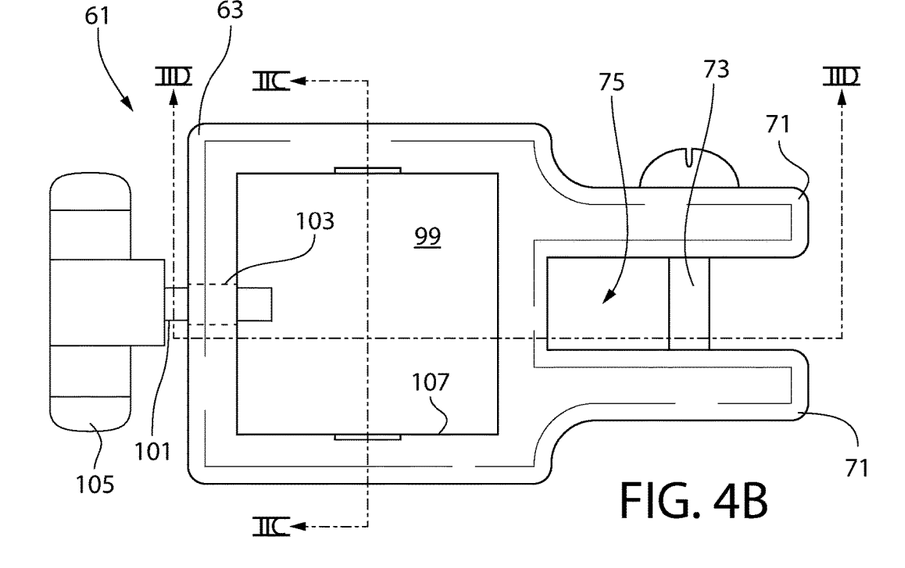
FIG. 4B is a top plan view of the arm clamp body of FIG. 3A.
Figure 4C:
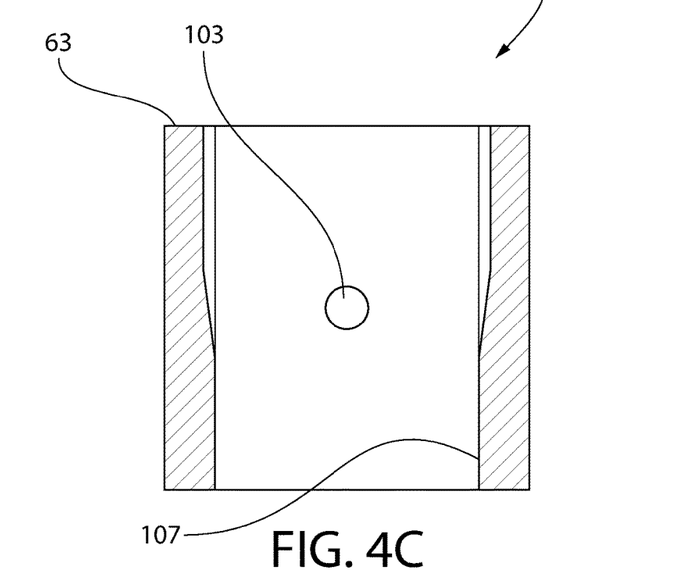
FIG. 4C is a sectional view of the arm clamp body along the line IIIC-IIIC of FIG. 4B.
Figure 4D:
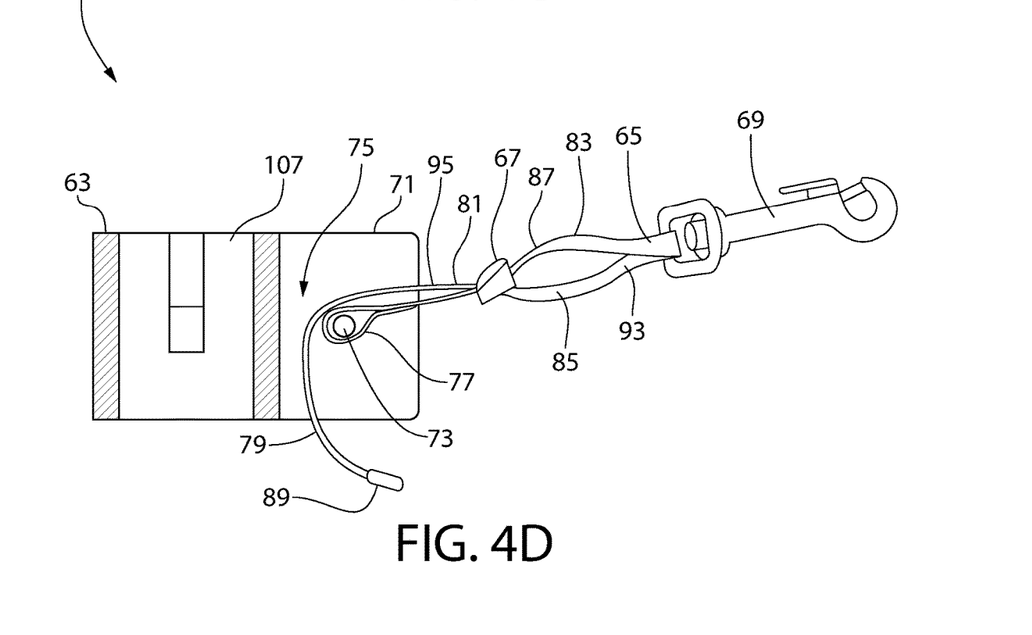
FIG. 4D is a sectional view of the arm clamp body along the line IIID-IIID of FIG. 4B.

One embodiment of an arm clamp 61 that may be used as part of a restraint system is illustrated in FIGS. 4A-D. The arm clamp 61 includes a clamp body 63, a tether 65, a tether clamp 67, and a tether connector 69. Referring to FIGS. 4A and 4B, the clamp body 63 includes two outward-extending arms 71, which are spaced apart from one another, and a tether anchor 73 coupled between the two arms 71. A tether guide 75 is formed as an aperture bordered on each of three sides respectively by the two arms 71 and the tether anchor 73. The tether guide 75 may be bordered on the fourth side by a portion of the clamp body 63 or by the securing arm to which the clamp body 63 is affixed.

The tether 65 includes a first tether end 77 coupled to the tether anchor 73 and a second tether end 79 which extends through the tether guide 75. The middle portion 81 of the tether 65 forms a tether loop 83 having a first loop side 85 extending from the first tether end 77 and a second loop side 87 extending from the second tether end 79 through the tether guide 75. The second tether end 79 includes a stopper 89, which may be a knot formed at the second tether end 79 or a metal or plastic end cap attached to the second tether end 79. The stopper 89 has at least one cross-sectional dimension that is larger than a cross-sectional dimension of the aperture forming the tether guide 75 so that the second tether end 79 does not pass through the tether guide 75. The stopper 89 may also be shaped so that as it is drawn between the two outward-extending arms 71, the stopper 89 is forced to rotate by the two outward-extending arms 71 so that the cross-sectional dimension of the stopper 89 that is larger is aligned with a smaller cross-sectional dimension of the aperture forming the tether guide 75, thereby preventing the stopper 89 from passing through the aperture. With such a configuration, the second tether end 79 remains in position for the user to pull when desired. The tether 65 may be made of a material such as nylon webbing, polyester webbing, cotton webbing, cloth, or any other desired material appropriate for a particular usage.

The tether clamp 67 is slidably disposed over the first and second loop sides 85, 87, dividing the tether loop 83 into a primary tether loop 93 and a secondary tether loop 95, with the tether clamp 67 maintaining the size of the primary tether loop 93. The tether connector 69 is slidably coupled to the primary tether loop 93 for coupling the tether 65 to one of the connectors of the restraining loop 25.

The relative positions of the tether anchor 73 and the tether guide 75 maintain substantial alignment between the first loop side 85 and the second loop side 87 when the loop 83 is tensioned, and the enlarged stopper at the second tether end 79 helps ensure that this substantial alignment configuration is maintained during use of the arm clamp 61. The loop 83 is tensioned when at least one of the first or second loop sides 85, 87 is tensioned, and generally only the first loop side 85 will be tensioned when an animal is placed within the restraining loop 25. By having substantial alignment between the first loop side 85 and the second loop side 87 when the loop 83 is tensioned, a groomer or pet owner may pull on and tension the second tether end 79, drawing the second loop side 87 over the first tether end 77 and the tether anchor 73, so that the size of the primary tether loop 93 is decreased. Closure of the tether clamp 67 will maintain the reduced size of the primary tether loop 93, thereby better securing the animal for washing or grooming by increasing tension in the restraining loop 25.

The clamp body 63 forms an arm aperture 99 which is configured in size and shape to receive one of the securing arms. A threaded rod 101 threadably engages a threaded through hole 103 in the clamp body 63 to enable the clamp body to be secured in place on a securing arm. A handle 105 is affixed to the end of the threaded rod 101 so that the threaded rod 101 may be rotated by hand. In certain embodiments, the clamp body 63 may be configured to extend only partially around a securing arm, while still effectively forming an arm aperture and having a threaded rod engaging the clamp body to secure the clamp body 63 to a securing arm.

Figure 5:
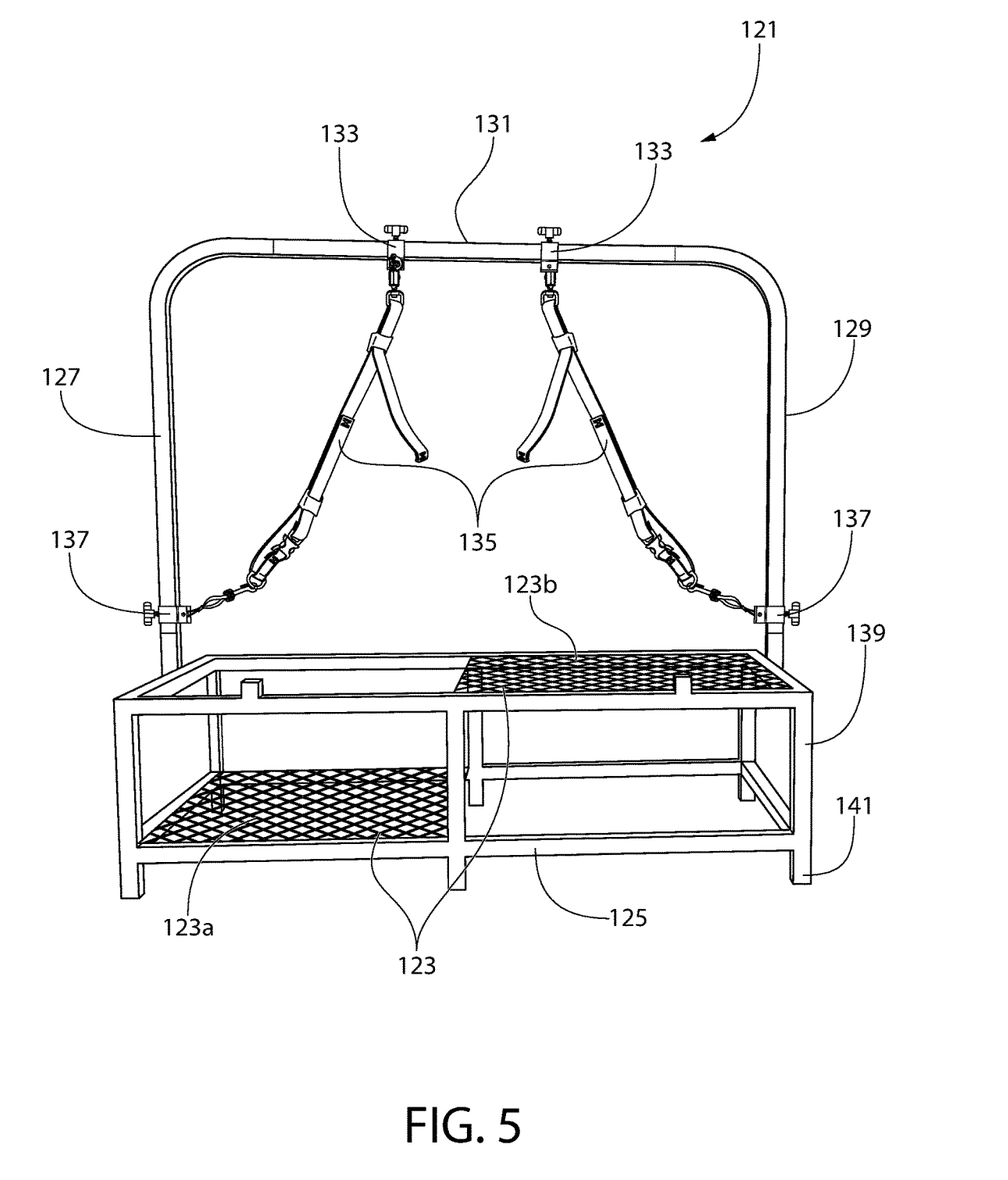
FIG. 5 is a perspective view of a third restraint system for an animal.

A second embodiment of a restraint system 121 is illustrated in FIG. 5. A perforated support surface 123 is affixed to a bottom frame 125 to create one side of the restraint system 121 with a lower level support surface 123a and the other side with an upper level support surface 123b. A first riser arm 127 is affixed to and extends upward from a first side of the bottom frame 125, and a second riser arm 129 is affixed to and extends upward from a second side of the bottom frame 125, with the first and second sides being opposite each other. In order to maximize free space for an animal when the restraint system 121 is placed within a wash basin, the first and second riser arms 127, 129 are positioned in approximately the center the respective first and second sides of the bottom frame 125. Of course, alternative placements for the first and second riser arms 127, 129 may also be used. In addition, the first and second riser arms 127, 129 need not be symmetrically placed. A cross arm 131 is coupled between the first riser arm 127 and the second riser arm 129. The cross arm 131 includes two upper couplers 133 which serve as upper connection points for the restraining loops 135. Each of the first and second riser arms 127, 129 include side couplers 137 which serve as side connection points for purposes of cross tying the restraining loops 135.

The bottom frame 125 is constructed to provide a support base for the first and second riser arms 127, 129 and a mutli-level platform for the perforated support surface 123. As such, the bottom frame is rigidly constructed. As shown in FIG. 5, the bottom frame 125 is formed as a box frame 139 with short riser legs 141 supporting the box frame 139. The box frame 139 provides multiple support levels to which the perforated support surface 123 to create the lower level support surface 123a and the upper level support surface 123b. Additional structure may be added to the box frame 139 to create additional support levels. The riser legs 141 serve to elevate the bottom of the box frame 139 sufficiently to effectively create a single flow channel under the restraint system 121. This enables liquid to flow freely underneath the box frame 139, which is especially important when the restraint system 121 is placed within a wash basin, so that the liquid can flow to the drain without the animal standing in the liquid. Alternatively, the box frame 139 may be constructed to have flow channels without inclusion of the riser legs 141.

Both the first and second riser arms 127, 129 extend upward from the bottom frame 125 to support the cross arm 131. The combination of the first and second riser arms 127, 129 and the cross arm 131 may be constructed from any number of segments, and all may be constructed from a tubular material, such as a stainless steel tube. As shown, the cross arm 131 is in a fixed position relative to the first and second riser arms 127, 129, however in alternative embodiments, the cross arm 131 may be movably affixed to the first and second riser arms 127, 129 so that the height of the cross arm 131 above the perforated support surface 123 is adjustable.

The side couplers 137 are shown as arm clamps, as such arm clamps are height adjustable on the respective first and second riser arms 127, 129. One embodiment of such arm clamps is described in greater detail below. Other types of side couplers 137 may be used, such as eyebolts, hooks, swivel clasps, and the like. Both of the side couplers 137 need not be the same type of coupler.

The upper couplers 133 are shown as arm clamps extending downward from the cross arm 131. Other types of upper couplers 133 may be used, such as eyebolts, hooks, swivel clasps, and the like. Both of the upper couplers 133 need not be the same type of coupler.

In some configurations, the side coupler 137 and upper coupler 133 on one side of the restraint system 121 may be omitted. The same types of restraining loops may be used with the restraint system 121 as shown with the restraint system 11 of FIG. 1.

Figure 6A:
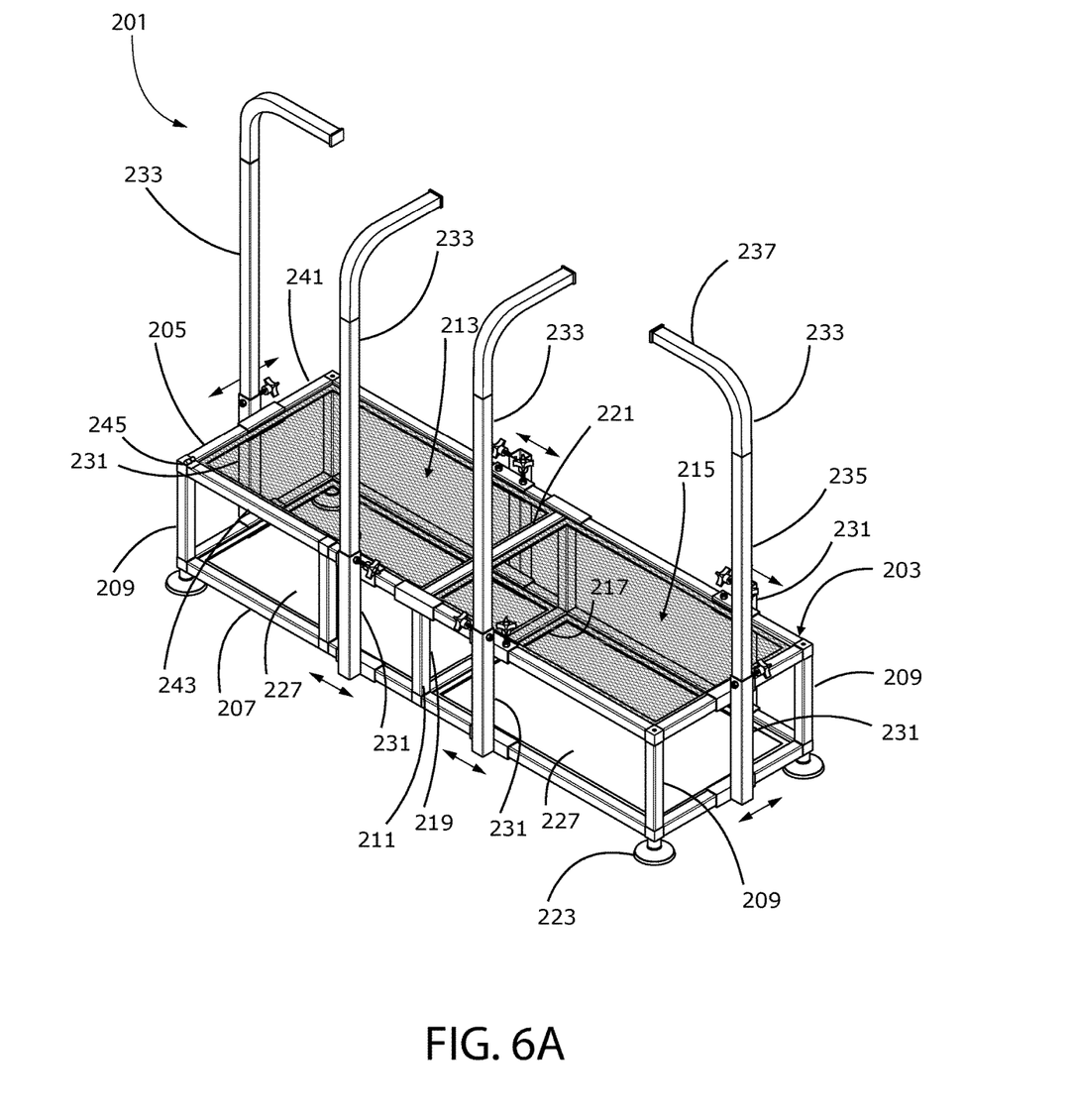
FIGS. 6A-D illustrate multiple configurations of a fourth restraint system for an animal.
Figure 6B:
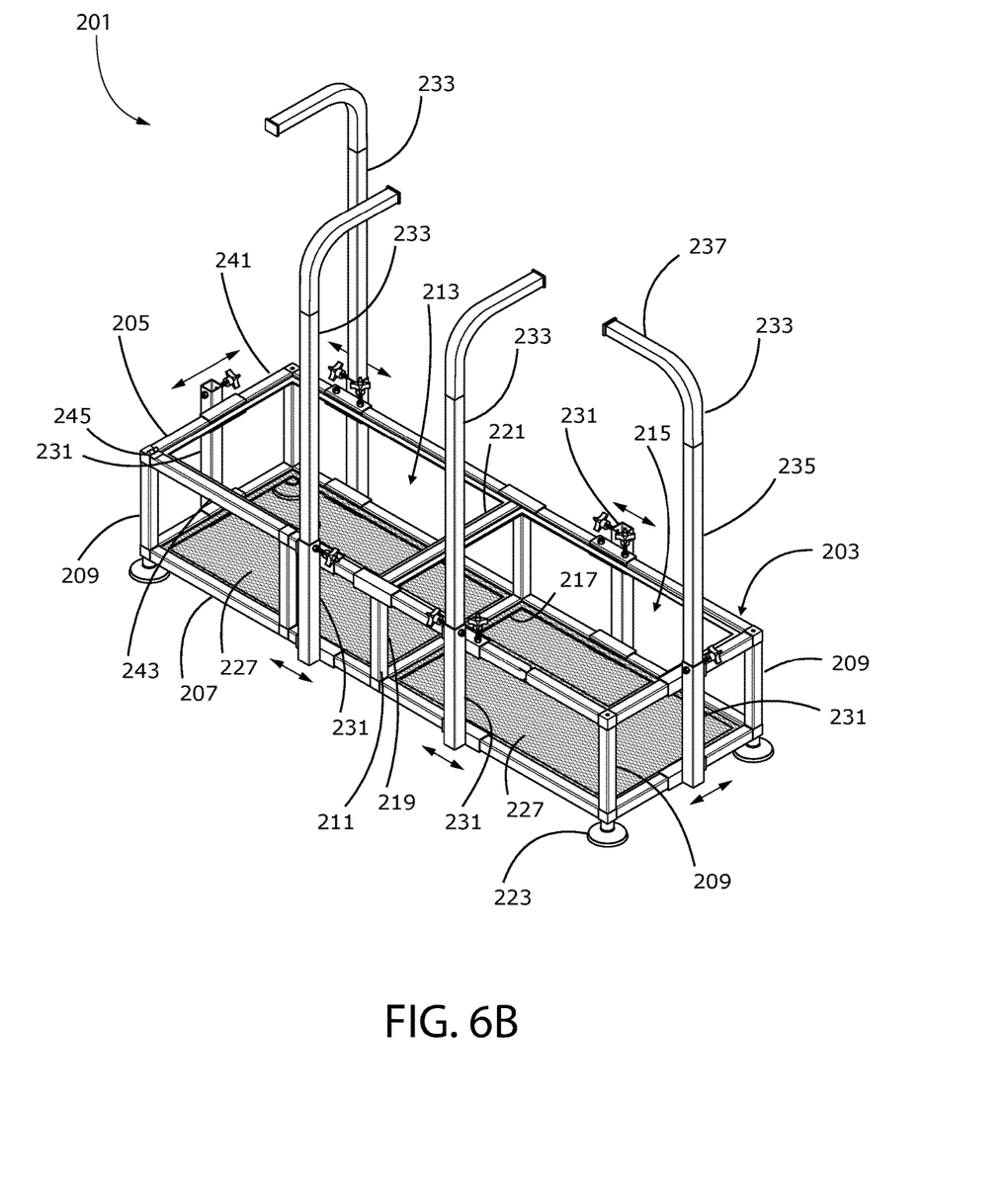
Figure 6C:
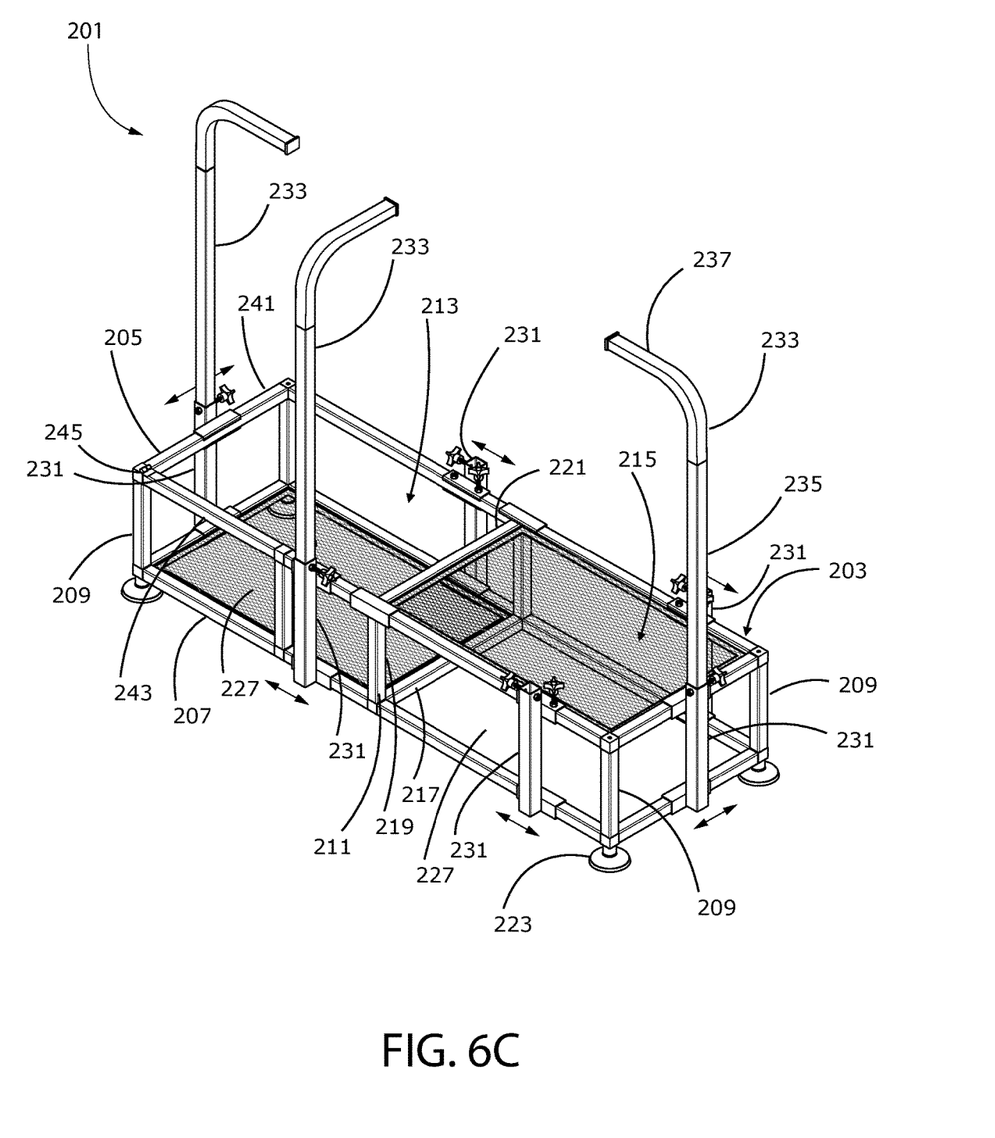
Figure 6D:
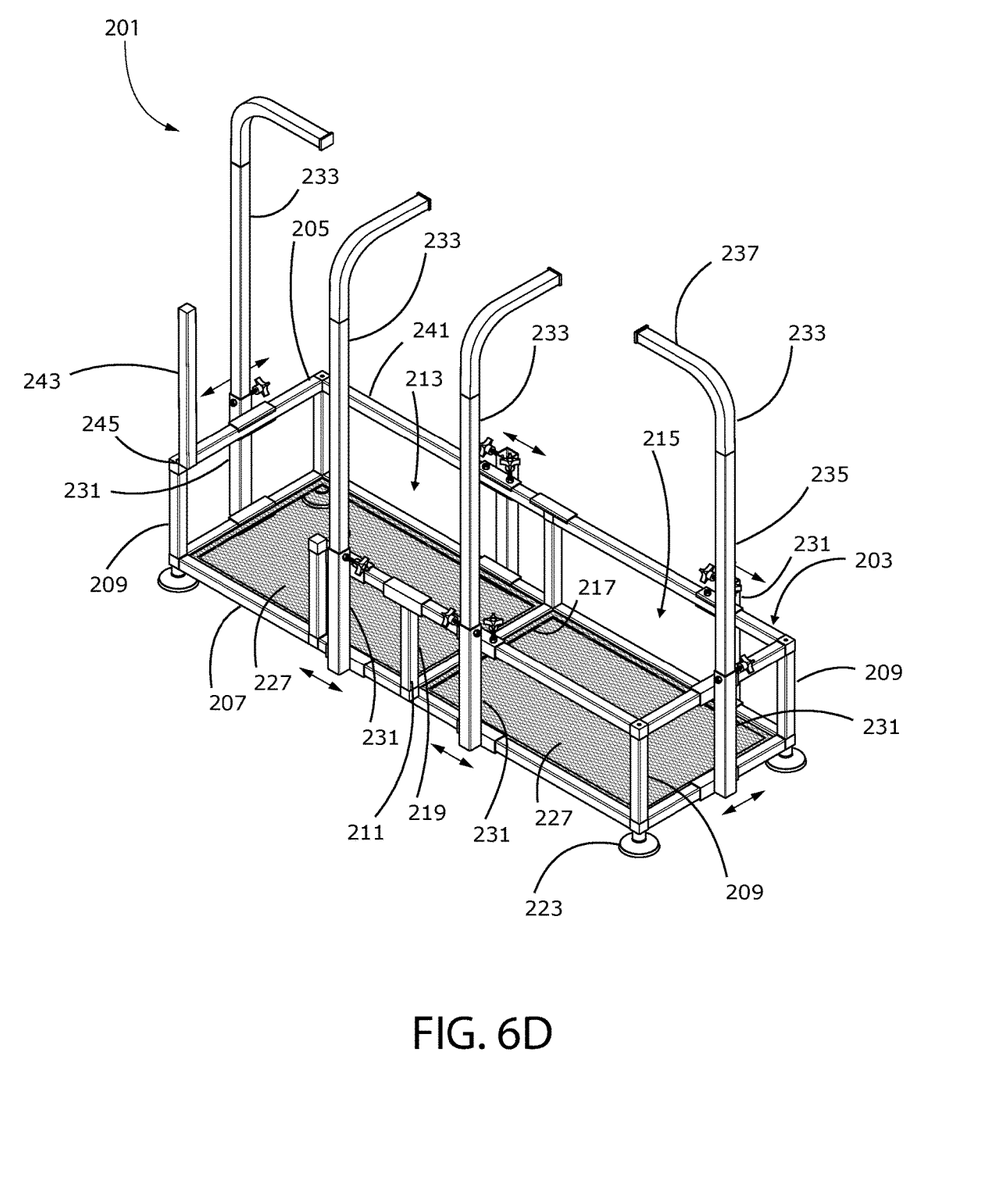

Multiple configurations of another embodiment of a restraint system 201 are shown in FIGS. 6A-D. In this embodiment, a box frame 203 is formed from a top frame part 205, a bottom frame part 207, and frame risers 209. The frame risers 209 are affixed between the top and bottom frame parts 205, 207 to maintain the top and bottom frame parts 205, 207 in a spaced apart manner. The box frame 203 also includes a center frame part 211 which separates the box frame 203 into a first section 213 and a second section 215. The center frame part 211 includes a bottom strut 217, two side struts 219, and a top strut 221. The bottom strut 217 and the two side struts 219 are in fixed positions with respect to the top and bottom frame parts 205, 207, whereas the top strut 221 may be removable from the top frame part 205, as shown in FIG. 6D. In certain embodiments, the top strut 221 may be affixed to and not removable from the top frame part 205.

A perforated support surface 227 may be affixed to the bottom frame part 207 in both the first and second sections 213, 215. In such a configuration, the perforated surface 227 is disposed in a plane which is parallel to the plane defined by the top (and bottom) surface of the bottom frame part 205. The top strut 221 may be in position coupled to the top frame part 205 to serve as a separator between the first and second sections 213, 215. The top strut 221 may alternatively be removed from the top frame part 205 so that the first and second sections 213, 215 are not physically divided or separated. In certain embodiments, the perforated support surface 227 may be affixed to the top frame part 205 in both the first and second sections 213, 215. In such a configuration, the perforated support surface 227 would be disposed in a plane which is parallel to the plane defined by the top (and bottom) surface of the top frame part 205. In certain other embodiments, one perforated support surface 227 may be affixed to the top frame part 205 in one of the first and second sections 213, 215, and another perforated support surface 227 may be affixed to the bottom frame part 207 in the other of the first and second sections 213, 215. In such a configuration, the arrangement of the two perforated support surfaces 227 is similar to the arrangement of the perforated support surfaces 123 shown in FIG. 5, with one perforated support surface 227 disposed in a first plane which is parallel to the plane defined by the top (and bottom) surface of the top frame part 205, and the other perforated support surface 227 disposed in a second plane which is parallel to the plane defined by the top (and bottom) surface of the bottom frame part 207. The first plane and the second plane in such a configuration would be parallel and not coplanar.

The box frame 203 may be entirely formed out of tube stock which is fixed together by welding, fasteners, or any other appropriate joint coupling, and thus it may be rigidly constructed. Feet 223 are affixed to the bottom frame part 207, and when the restraint system 201 is used within a wash basin, the feet 223 support the bottom frame part 207 above the surface of the wash basin so that water can freely flow under the box frame 203.

The restraint system 201 further includes a plurality of riser support members 231 coupled to the top frame part 205 and to the bottom frame part 207. Each of the riser support members 231 may be slidably coupled to the top and bottom frame parts 205, 207, so that each riser support member 231 is slidable along the top and bottom frame parts 205, 207 as illustrated by the arrows in FIGS. 6A-D. Each riser support member 231 slides in a longitudinal direction along the respective side of the top and bottom frame parts 205, 207 to which it is coupled. In certain embodiments, one or more of the riser support members 231 may be secured in a fixed position with respect to the top and bottom frame parts 205, 207.

As part of the restraint system 201, a riser arm 233 is affixed to each of the riser support members 231, such that each riser arm 233 is affixed to and extends upward from the one of the riser support members 231. In certain embodiments, the restraint system 201 may include one or more riser support members 231 which do not have riser arms 233 affixed thereto, as is shown in FIG. 6A. In certain embodiments, both the riser arms 233 and the body of the riser support members 231, which extends between the top and bottom frame parts 205, 207, may be constructed from tube stock. The riser arms 233 may be removably affixed to the riser support members 231, such that each riser arm 233 may be affixed to the riser support member 231 best positioned for a user's needs when an animal is cross tied in the restraint system 201.

Each riser arm 233 in the restraint system 201 may include a rising portion 235 and a lateral portion 237, where the rising portion 235 curves into the lateral portion 237. As shown, the rising portion 235 of each riser arm 233 is orthogonal to planes defined by the respective top surfaces of the top and bottom frame parts 205, 207, and the lateral portion 237 extends in a direction that is parallel to those planes. In certain embodiments, one or more of the riser arms 233 may include only a rising portion 235. In other embodiments of the restraint system 201, one ore more of the riser arms 233 may be configured differently than those depicted and described herein. In still other embodiments, the restraint system 201 may include multiple different configurations of the riser arms 233.

Each riser arm 233 may include one or more connection points for connecting to a restraining loop (the connection points and the restraining loop are not shown in FIGS. 6A-D for purposes of clarity), such as the restraining loop 25 described above in connection with FIG. 1. The connection points for this exemplary embodiment are similar to the connection points described above. The connection points may be included on either one or both of the rising portion 235 or the lateral portion 237 of each riser arm 233. For each riser arm 233, the one or more connection points may be placed at a fixed location, or the one or more connection points may be slidable along the riser arm 233. In certain embodiments, multiple connection points may be included on each riser arm 233, with the multiple connection points including at least one fixed connection point and at least one slidable connection point. By including at least one connection point on each riser arm 233, a restraining loop may be cross tied between first and second connection points, with the first connection point located on a first of the riser arms 233, and the second connection point located on a second of the riser arms 233. Further, both first and second connection points may be fixed on the respective riser arms 233, the first connection point may be fixed and the second connection point may be slidable with respect to the respective first and second riser arms 233, or both the first and the second connection points may be slidable with the respective riser arms 233. Alternatively, for embodiments in which one of the riser arms 233 includes two connection points, a restraining loop may be used to cross tie between the two connection points on the single riser arm 233. Even when both connection points are on the one of the riser arms 233, both connection points may be fixed, one connection point may be fixed and the other slidable, or both connection points may be slidable. The cross tying between any two connection points may be made in the manner described above.

As shown in FIGS. 6A-B, the restraint system 201 may include at least four riser support members 231, with each riser support member 231 having one of the riser arms 233 affixed thereto. Moreover, each of the four riser arms 233 includes at least one connection point, so that a first restraining loop may be cross tied between a first pair of the riser arms 233, and a second restraining loop may be cross tied between a second pair of the riser arms 233, with the first and second pair of riser arms 233 not including any of the same riser arms 233. Two animals may thus be independently cross tied using the restraint system 201 without concerns of the animals physically interacting. Of course, the restraint system 201 may be used with up to two riser arms 233 to cross tie a single animal.

In certain embodiments, each fixed connection point may be in the form of a fixed coupler, with each fixed coupler being any one of an eyebolt, a hook, a swivel clasp, and the like, such as is shown and described above in connection with FIGS. 1-3 above. In certain embodiments, each slidable connection point may be in the form of a slidable coupler, with each slidable coupler being an arm clamp, such as is shown and described above in connection with FIGS. 4A-D. The fixed and slidable couplers may take other forms, and are not to be limited to those expressly described herein unless otherwise limited by the claims.

As is most clearly shown in FIG. 6D, the top frame part 205 includes a first frame segment 241 and a second frame segment 243. The first frame segment 241 forms the majority of the top frame part 205, and the second frame segment 243 is pivotably coupled to the first frame segment 241 by a hinge 245. The second frame part 243 is pivotable between a closed position, as shown in FIGS. 6A-C, and an open position, as shown in FIG. 6D. When the second frame part 243 is in the open position, it can facilitate ingress and egress of an animal from the restraint system 201, particularly if the perforated surface is affixed to the bottom frame part 207. When the second frame part 243 is in the closed position, one of the riser support members 231 may be coupled to the second frame part 243.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A restraint system for an animal, the system comprising:
   a frame comprising:
      a top frame part;
      a bottom frame part; and
      a plurality of frame risers extending between the top and bottom frame parts and maintaining the top and bottom frame parts in a spaced apart manner;
   a perforated support surface affixed to at least one of the top frame part and the bottom frame part;
   a plurality of riser support members coupled to the top frame part and to the bottom frame part, wherein at least one of the riser support members is slidably coupled to the top and bottom frame parts, the plurality of riser support members comprising a first riser support member and a second riser support member;
   a first riser arm affixed to the first riser support member;
   a first coupler coupled to the first riser arm;
   a second riser arm affixed to the second riser support member;
   a second coupler coupled to the second riser arm; and
   a first restraining loop configured to be placed around a neck of a first animal and to cross tie between the first coupler and the second coupler.

2. The restraint system of claim 1, wherein the frame further comprising a plurality of feet affixed to the bottom frame part.

3. The restraint system of claim 1, wherein at least one of the first riser support member and the second riser support member is slidably coupled to the top and bottom frame parts.

4. The restraint system of claim 1, wherein the first coupler is slidably coupled to the first riser arm and is configured to be secured in a fixed position on the first riser arm, and wherein the second coupler is slidably coupled to the second riser arm and is configured to be secured in a fixed position on the second riser arm.

5. The restraint system of claim 1, the plurality of riser support members comprising a third riser support member and a fourth riser support member, the restraint system further comprising:
   a third riser arm affixed to the third riser support member;
   a third coupler coupled to the third riser arm;
   a fourth riser arm affixed to the fourth riser support member; and
   a fourth coupler coupled to the fourth riser arm.

6. The restraint system of claim 5, further comprising a second restraining loop configured to be placed around a neck of a second animal and to cross tie between the third coupler and the fourth coupler.

7. The restraint system of claim 5, wherein at least one of the third riser support member and the fourth riser support member is slidably coupled to the top and bottom frame parts.

8. The restraint system of claim 5, wherein the third coupler is slidably coupled to the third riser arm and is configured to be secured in a fixed position on the third riser arm, and wherein the fourth coupler is slidably coupled to the fourth riser arm and is configured to be secured in a fixed position on the fourth riser arm.

9. The restraint system of claim 1, wherein the perforated support surface comprises a first surface section and a second surface section, the first surface section affixed to the top frame part and the second surface section affixed to the bottom frame part, and wherein the first surface section is disposed in a first plane and the second surface section is disposed in a second plane, the first and second planes being parallel and not coplanar.

10. The restraint system of claim 1, wherein the top frame part comprises a first frame segment and a second frame segment, the second frame segment pivotably coupled to the first frame segment.

11. A restraint system for an animal, the system comprising: a frame comprising:
   a top frame part; a bottom frame part; and
   a plurality of frame risers extending between the top and bottom frame parts and maintaining the top and bottom frame parts in a spaced apart manner; a perforated support surface affixed to the frame, the perforated support surface comprising a first surface section and a second surface section, wherein the first surface section is disposed in a first plane and the second surface section is disposed in a second plane, the first and second planes being parallel and non-coplanar;

a plurality of riser support members coupled to the top frame part, the plurality of riser support members comprising a first riser support member and a second riser support member;
a first riser arm affixed to the first riser support member; a first coupler coupled to the first riser arm; a second riser arm affixed to the second riser support member; a second coupler coupled to the second riser arm;
a first restraining loop configured to be placed around a neck of a first animal and to cross tie between the first coupler and the second coupler; and
wherein each riser support member is coupled to the top frame part and to the bottom frame part, at least one of the riser support members being slidably coupled to the top and bottom frame parts.

12. The restraint system of claim 11, wherein the first coupler is slidably coupled to the first riser arm and is configured to be secured in a fixed position on the first riser arm, and wherein the second coupler is slidably coupled to the second riser arm and is configured to be secured in a fixed position on the second riser arm.

13. The restraint system of claim 11, wherein the plurality of riser support members comprise a third riser support member and a fourth riser support member, the restraint system further comprising:
 a third riser arm affixed to the third riser support member;
 a third coupler coupled to the third riser arm;
 a fourth riser arm affixed to the fourth riser support member; and
 a fourth coupler coupled to the fourth riser arm.

14. The restraint system of claim 13, further comprising a second restraining loop configured to be placed around a neck of a second animal and to cross tie between the third coupler and the fourth coupler.

15. The restraint system of claim 13, wherein at least one of the third riser support member and the fourth riser support member is slidably coupled to the top and bottom frame parts.

16. The restraint system of claim 13, wherein the third coupler is slidably coupled to the third riser arm and is configured to be secured in a fixed position on the third riser arm, and wherein the fourth coupler is slidably coupled to the fourth riser arm and is configured to be secured in a fixed position on the fourth riser arm.

17. The restraint system of claim 11, wherein the top frame part comprises a first frame segment and a second frame segment, the second frame segment pivotably coupled to the first frame segment.

18. A restraint system for an animal, the system comprising:
 a frame comprising:
  a top frame part comprising a first frame segment and a second frame segment, the second frame segment pivotably coupled to the first frame segment;
  a bottom frame part; and
  a plurality of frame risers extending between the top and bottom frame parts and maintaining the top and bottom frame parts in a spaced apart manner;
 a perforated support surface affixed to the frame, the perforated support surface comprising a first surface section and a second surface section, wherein the first surface section is disposed in a first plane and the second surface section is disposed in a second plane, the first and second planes being parallel and non-coplanar;
 a plurality of riser support members coupled to the top frame part and to the bottom frame part, wherein at least one of the riser support members is slidably coupled to the top and bottom frame parts, the plurality of riser support members comprising first, second, third, and fourth riser support members;
 a first riser arm affixed to the first riser support member;
 a first coupler coupled to the first riser arm;
 a second riser arm affixed to the second riser support member;
 a second coupler coupled to the second riser arm;
 a third riser arm affixed to the third riser support member;
 a third coupler coupled to the third riser arm;
 a fourth riser arm affixed to the fourth riser support member; and
 a fourth coupler coupled to the fourth riser arm.

19. The restraint system of claim 18, further comprising a first restraining loop configured to be placed around a neck of a first animal and to cross tie between any two of the first, second, third, and fourth couplers.

* * * * *